(12) United States Patent
Ishii

(10) Patent No.: US 6,601,614 B1
(45) Date of Patent: Aug. 5, 2003

(54) BASE CLOTH FOR AIR BAG (75) Inventor: Hideaki Ishii, Ashiya (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 10/048,364

(22) PCT Filed: Aug. 1, 2000

(86) PCT No.: PCT/JP00/05088
§ 371 (c)(1),
(2), (4) Date: Feb. 1, 2002

(87) PCT Pub. No.: WO01/09416
PCT Pub. Date: Feb. 8, 2001

(30) Foreign Application Priority Data

Aug. 2, 1999 (JP) ............................ 11-218410

(51) Int. Cl.[7] .............................................. D03D 1/04
(52) U.S. Cl. ................ 139/389; 139/420 A; 280/743.1
(58) Field of Search ............. 139/420 A, 389; 280/743.1

(56) References Cited

U.S. PATENT DOCUMENTS 6,182,709 B1 * 2/2001 Konishi et al. ............. 139/389
6,283,507 B1   9/2001 Kami et al. ............... 280/743.1

FOREIGN PATENT DOCUMENTS

| JP | 5-339840 | 12/1993 |
| JP | 6-228879 | 8/1994 |
| JP | 10-60750 | 3/1998 |
| WO | WO 99/22967 | 5/1999 |
| WO | WO99/28164 | 6/1999 |

* cited by examiner

Primary Examiner—John J. Calvert
Assistant Examiner—Robert H. Muromoto, Jr.
(74) Attorney, Agent, or Firm—Finnegan, Henderson, Farabow, Garrett & Dunner, L.L.P.

(57) ABSTRACT

A woven fabric for an air bag formed of a polyamide fiber and having a single filament size of 0.5 to 4.5 dtex and a yarn size of 67 to 250 dtex for its warp and weft, the polyamide fiber containing 1 to 200 ppm of copper as a copper compound; the woven fabric having a product of yarn size of the fiber and weave density of not greater than 20,000, the woven fabric having at least 0.8 wt % of an oiling agent, the oiling agent being applied to the yarn prior to weaving, a Metsuke of 250 g/m², a thickness of not greater than 0.30 mm, a mean bending rigidity (B) of 0.5 to 5 mN·cm², and self-extinguishing properties; and a lightweight air bag produced by the woven fabric that can be compactly folded but hard to unfold to a loosely folded state, yet can smoothly deploy into a designed shape at the time of inflation.

15 Claims, 2 Drawing Sheets

BASE CLOTH FOR AIR BAG

TECHNICAL FIELD

This invention relates to an air bag that mitigates the impact a passenger receives at the time of collision of a car, and protects the passenger. More particularly, this invention relates to a base fabric for an improved air bag for obtaining a lightweight air bag that can be folded into a compact accommodation or stowable shape hard to unfold or revert, with repulsion, to a loosely folded state, and allows the air bag to smoothly deploy into a predetermined shape at the time of inflation.

BACKGROUND ART

It has become a common in the art to provide a passenger car with an air bag as a passenger protection safety device. The air bag as the passenger protection safety device is generally fitted in a module having a built-in inflator, and installed in a limited place such as a steering wheel or an instrument panel. Under such circumstances, an air bag is stowed only in a small accommodation space and is expected to be light in weight.

Reduction of the space or room to accommodate the air bag has been strongly required in recent years to increase a open space provided in the steering wheel for the sake of viewing instruments such as a speedometer panel or to increase the cabin space of the car as much as possible. To satisfy these requirements, an improved base fabric for an air bag has been required. The base fabric should have foldability for making the folded air bag more compact in size. The base fabric should be improved in the aspects of the properties so as not to deteriorate the deployment ability of the air bag, and should be more flexible.

There are two types of base fabric available for air bag. One is a base fabric provided with an elastomer coating layer such as a silicone resin to a woven fabric, and the other is an uncoated air bag base fabric not having the elastomer coating for the purpose of obtaining a light weight air bag and curtailing the coating cost.

Mechanical properties of a coated fabric are enhanced due to the presence of the coated layer provided on the base fabric. However, a base fabric for use as an uncoated air bag can not be expected to have the coated layer provided by which mechanical properties of the fabric are enhanced. Accordingly, in an uncoated air bag, deterioration in tear strength of the base fabric is observed in an accelerated heat resistance test (at 120 degree Celsius for 400 hours) which simulates an air bag equipped under an elevated temperature over a long time.

Attempts are known from Japanese Unexamined Patent Publications (Kokai) No. 5-339840, No. 6-228879, No. 10-15 60750, etc, to mitigate the deterioration in the tear strength by applying an oiling agent. Japanese Unexamined Patent Publication (Kokai) No. 5-339840 describes an air bag base fabric that is produced by allowing 0.08 wt % to 0.8 wt % of an oiling agent to be imparted to a woven fabric woven on a water jet loom by using a polyamide fiber having a yarn size of up to 450 deniers for both warp and weft and omitting scouring and has a cover factor of at least 1,700. This base fabric also prevents the deterioration in the flame proofing property. Japanese Unexamined Patent Publication (Kokai) No. 6-228879 describes a production method of a woven base fabric for an air bag that is a scoured woven fabric having a cover factor of at least 1,700 formed of a fiber having a yarn size of not greater than 450 denier, and that contains 0.6 to 5.0 wt % of an aqueous oiling agent imparted to the fabric on the basis of the fabric by means of impregnation so that the deterioration in flame proofing property of the fabric is lessened. Japanese Unexamined Patent Publication (Kokai) No. 10-60750 describes a base fabric for an air bag, woven by a Nylon 6 fiber, having a cover factor of at least 2,100, air permeability of not greater than 20 $cc/cm^2/sec$, and containing up to 0.2% of a heat resistant lubricant for reducing the tear strength.

Attempts have been made in the base fabric for the air bag to use fine fibers for forming the woven fabric in order to further reduce the weight of the air bag and its stowability in the air bag casing.

The WO/99/22967 specification filed by the applicant of the present application describes a base fabric for an air bag to obtain an air bag having a smaller weight. In comparison with a known air bag for a driver's seat that comprises a base fabric for an air bag using nylon 66 yarn of 350 dtex and having a thickness of 0.28 mm and Metsuke (basis of weight per unit area of fabric) of 170 $g/m^2$, and has a bag body weight of 200 g and a folding thickness of 30 mm or more, this prior art technology is directed to reduce both weight and thickness by about 20%, preferably 30%. The base fabric for the air bag of this prior art is formed of a polyamide type synthetic fiber containing 30 to 100 ppm of a copper compound calculated as copper, and is woven by warp and weft having a single filament size of 1.0 to 3.3 dtex and a yarn size of 66 to 167 dtex. Example 1 of the specification of this prior art reference describes a 60-liter air bag for a driver's seat using a woven fabric produced in the following way for a base fabric. Multifilament yarns of 78 dtex/35 filaments are obtained from polyhexamethylene adipamide containing 70 ppm of copper and having a formic acid relative viscosity of 60. The woven fabric is formed of the warp of a doubled yarn (sized yarns) and the weft of a doubled yarn, and is then scoured to prepare a woven fabric having a weave density of 95 ends/2.54 cm and 93 picks/2.54 cm (woven yarn size parameter: 14,820 end.dtex/2.54 cm for the warp direction, 14,508 pick.dtex/2.54 cm for the weft direction), thickness of 0.198 mm and a Metsuke (basis of fabric weight per unit area fabric) of 125/$m^2$. The woven fabric exhibits a tensile strength retention ratio of 95% after the accelerated heat resistance test described above.

However, the air bag base fabric using the woven fabric of the polyamide fiber having such a small filament size involves the problem that the tear strength of the base fabric remarkably deteriorates in the accelerated heat resistance test. In the case of the high weave density woven fabric composed of yarns having a small filament size, another problem is encountered in that a sizing agent for weaving remains among the small size filaments without being scoured off, and accelerates combustion. It is indeed amazing that in such a woven fabric having a small filament size, an extremely small amount of a residual oil cannot improve a tear strength retention ratio, and the oiling agent must be again imparted to the small filament size woven fabric after scouring in order to pass the combustion test.

The inventor of the present invention has produced an air bag in accordance with the description of the WO99/28164 specification by using an air bag base fabric comprising a woven fabric formed of polyamide fiber used for both warp and weft each having a small filament size but by using a different weaving method and different post-treatment (scouring) of the woven fabric. The present inventor has subjected this air bag to a deployment test and observed it through a high-speed VTR. As a result, the present inventor has found that not only folding performance of the air bag but also its deployment performance depend on the weaving method and the application of scouring to the woven fabrics of the polyamide fibers having a small filament size, that is, on adhesion of the oiling agent applied during the production process of the base fabric, and that the bending property of the woven fabric that reduces repulsive unfolding of the air bag and its surface properties such as surface coarseness and the frictional property are also the factors affecting smooth deployment of the air bag. The present inventors have thus clarified that the woven fabric of the polyamide fiber having such properties can be accomplished by use of a non-sized yarn woven fabric that does not at all require desizing and scouring treatment when a polyamide fiber having a yarn size within a specific region is woven on an air jet loom.

BRIEF DESCRIPTION OF DRAWINGS

FIGS. 1 to 5 show an observation of a deploying process of a driver's seat air bag in a deployment test of the air bag by using a high-speed VTR (Video Tape Recorder) as viewed from the front surface, wherein:

DISCLOSURE OF THE INVENTION

It is an object of the present invention to provide a base fabric for an air bag, formed of a polyamide fiber woven fabric, that is light in weight, can be folded into a compact stowing shape hard to unfold and can smoothly deploy into a designed shape at the time of inflation. It is another important object of the present invention to provide, in the lightweight air bag described above, a base fabric for an air bag having particularly a high tear strength retention ratio and can easily pass a combustion test according to an FMVSS302 method.

The present invention is completed on the basis of the finding that a woven fabric obtained by weaving a high-tenacity polyamide fiber yarn containing a copper compound and having a small yarn size within a specific range and specific strength and elongation properties as both warp and weft on an air jet loom and a fabric as formed on the loom (grey fabric), has, under its, a specific surface coarseness, low frictional property and bending property. Owing to such properties, this woven fabric can be used as a base fabric of an air bag that fulfilled the objects described above.

The present invention provides a base fabric for an air bag comprising a woven fabric whose warp and weft are formed of a polyamide fiber having a copper content of 1 to 200 ppm, a single filament size of 0.5 to 4.5 dtex, a yarn size of 67 to 250 dtex and a tensile strength of at least 5.7 cN/dtex, wherein at least 0.8 wt % of an oiling agent is allowed to be adhered or imparted to the woven fabric.

According to the present invention, the weight of the fabric of the polyamide fiber per unit area is not greater than 250 g/m$^2$ and its thickness is not greater than 0.30 mm. To accomplish the objects of the invention described above, the mechanical properties and/or the surface properties of the woven fabric preferably satisfy the following conditions.

(1) The bending rigidity of the woven fabric per unit width of the fabric is 0.5 to 5 mN·cm$^2$/cm in terms of a mean bending rigidity (B) in KES measurement.

(2) The surface of the woven fabric has a surface coarseness of 1 to 7 μm in terms of a surface coarseness (SMD) in KES measurement and is 0.004 to 0.04 in terms of a mean deviation (MMD) of a coefficient of friction, and bending recovery of the woven fabric is 0.5 to 5 mN·cm/cm in terms of a mean bending hysteresis width (2 HB) in KES measurement.

The base fabric for air bag according to the present invention is a woven fabric construction having a woven yarn size parameter of 10,000 to 20,000 end (or pick).dtex/2.54 cm, preferably 16,000 end.dtex /2.54 cm as expressed by the product value of the yarn size of the polyamide fiber represented by deci-tex (dtex) and the number of warp ends (or picks for weft)/2.54 cm in each of the warp direction and the weft direction of the woven fabric. This woven fabric has the mechanical properties such as tensile strength and tear strength of the predetermined levels required for the base fabric for air bag.

The base fabric for the air bag according to the present invention can be used both for a base fabric for a coated air bag and a base fabric for a uncoated air bag. When it is used as the base fabric for the uncoated air bag, air permeation is preferably not greater than 4 cm$^3$/cm$^2$/sec by a Frazier test method (at a water column height of 12.7 mm), particularly preferably not greater than 2 cm$^3$/cm$^2$/sec. When the base fabric of this invention is used as a base fabric for the coated air bag, on the other hand, a woven fabric having a lower air permeability of 0.2 cm$^3$/cm$^2$/sec or a woven fabric having air impermeability is selected. In order for the base fabric for a coated air bag to pass the FMVSS302 combustion test, a suitable flame-retarding agent is preferably added to the coating resin.

The base fabric for air bag according to the present invention can be produced by a method of producing a base fabric for a lightweight air bag comprising weaving non-sized polyamide yarn as warp and weft having a single filament size of 0.5 to 4.5 dtex and a yarn size of 67 to 250 dtex, without application of sizing agent to the warp on an air jet loom to obtain a grey woven fabric having a weave density of 80 ends (or picks) or more/2.54 cm in the directions of warp and weft, and the woven fabric so obtained is used for producing an air bag without scouring.

Figure 1:
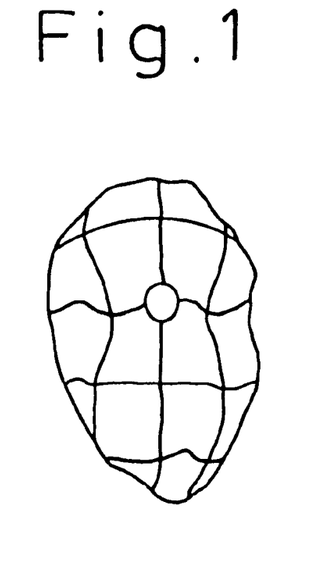
FIG. 1 shows an expansion shape of the air bag using an air bag base fabric of Example 1 formed of polyamide fiber yarns having a single filament size of 3.3 dtex and a yarn size of 155 dtex, at 15 msec after the initiation of deployment of the air bag.
Figure 2:
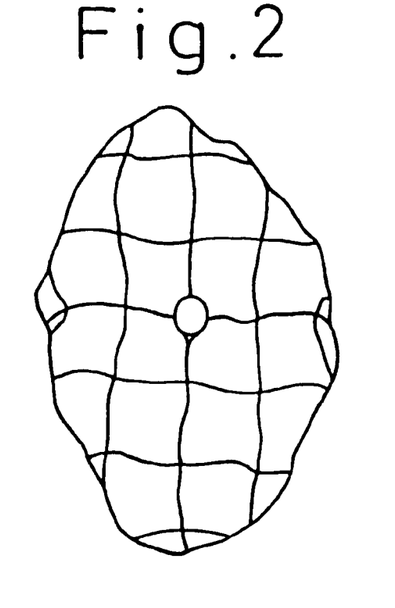
FIG. 2 shows a deployment shape of the air bag using the air bag base fabric of Example 1 consisting of polyamide fiber yarns having a single filament size of 3.3 dtex and a yarn size of 155 dtex, at 15 msec after the initiation of deployment of the air bag.
Figure 3:
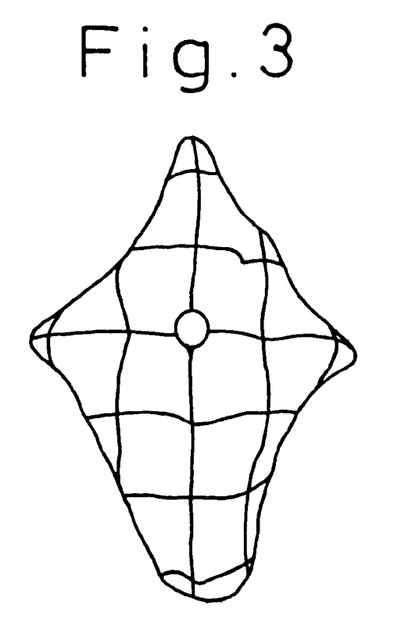
FIG. 3 shows an deploying shape of an air bag using an air bag base fabric of Comparative Example 3 consisting of polyamide fiber yarns having a single filament size of 6.7 dtex and a yarn size of 470 dtex, at 15 msec after the initiation of deployment of the air bag.
Figure 4:
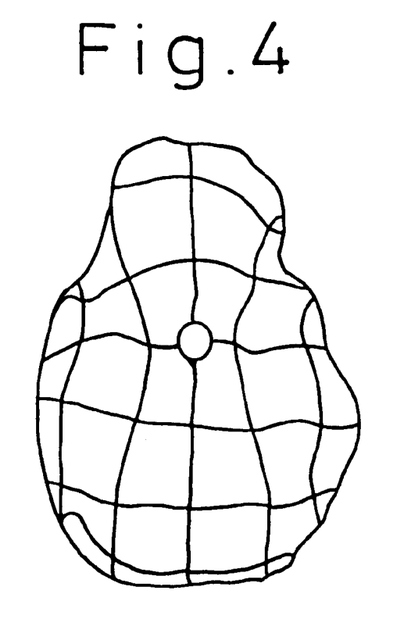
FIG. 4 shows an deploying shape of an air bag using an air bag base fabric of Comparative Example 3 consisting of polyamide fiber yarns having a single filament size of 6.7 dtex and a yarn size of 470 dtex, at 20 msec after the initiation of deployment of the air bag.
Figure 5:
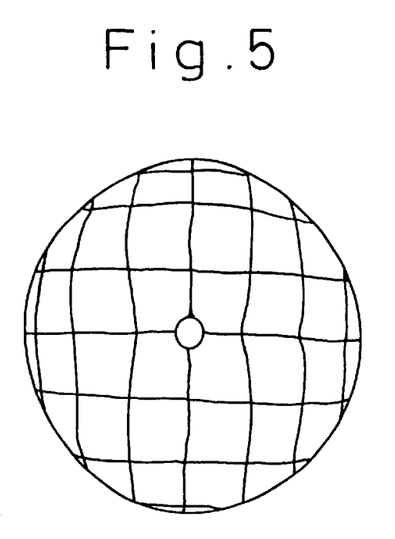
FIG. 5 shows an deploying shape of the air bag in the deployment test shown in FIG. 1 at the end of deployment (50 msec).

The base fabric for air bag according to the present invention can be formed into an air bag of any shape. In the case of a standard driver's seat air bag (60 liters by volume), by way of example, it is possible to produce an air bag that has a mass of not greater than 160 g/bag, a folded thickness of as small as 25 mm for a bag 150 mm square for stowing and an extremely compact folded shape and the air bag can be folded extremely easily. Since the air bag can be folded into the stowable shape through an extremely easy folding operation, the folded surfaces that are once folded do not at all revert to the unfolded state, and the compactly folded stowed shape can be kept substantially unchanged under an unloaded state. Therefore, the air bag (1) folded in this way can smoothly deploy from the stowed state into a shape almost similar to the designed shape (a circular shape as viewed plane-wise) from the initiation inflation process (see FIGS. 1, 2 and 5). The formation of the smooth deployment shape of the air bag makes it more reliable to buffer the impact to the driver and ensures the protection of the driver. For reference, FIGS. 3 and 4 show deployed shapes of air bags formed by using yarns having a large yarn size.

The present invention will now be explained in detail.

The polyamide fiber that constitutes the base fabric for air bag according to the present invention is not particularly limited so long as it is formed of a polyamide fiber made from a polyamide having the amide bond. The polyamide fiber in the present invention is preferably composed of a polyamide containing at least 80 mol % of polyhexamethylene adipamide and haivng a melting point of 215° C. or above. Examples of the polyamide fibers having higher heat resistance include a polyhexamethylene adipamide (hereinafter called simply "nylon 66") fiber having a melting point of 215° C. or above, nylon 66 containing nylon 66 based copolymer (nylon 66/6, nylon 66/61, nylon 66/610) fiber and nylon 66 fiber composed of nylon 66 containing other nylon type polymer (nylon 6, nylon 610). The polyamide fiber used in the present invention must contain a copper compound, and a copper content to the polyamide must be 1 to 200 ppm, more preferably 30 to 200 ppm. Even when the car is left standing for a long time in a high-temperature high-moisture environment or in an atmosphere containing large quantities of ozone, the deterioration in the tear strength of the base fabric or the deterioration in mechanical performance such as the tensile strength is restricted extremely in the air bag using the base fabric of the polyamide fiber according to the present invention. When the copper content is less than 1 ppm, the heat resistance strength retention ratio is lowered and when it exceeds 200 ppm, evenness of the fiber properties is deteriorated depending on the production method used.

The kind of the copper compound used in the present invention is not particularly limited. For example, organic copper compound such as copper acetate or halogenated copper compound such as cuprous chloride or cupric chloride can be preferably used. The copper compound is more preferably used in combination with a metal halide. Examples of the metal halide include potassium iodide and potassium chloride. The combinations that are most preferred in the present invention are cuprous iodide with potassium iodide and copper acetate with potassium iodide. The copper content in the polyamide may well be measured by a known method such as atomic absorptiometry or a calorimetric method.

The tensile strength of the polyamide fiber must be at least 5.7 cN/dtex, more preferably at least 6.2 cN/dtex. When the tensile strength is less than 5.7 cN/dtex, the resulting air bag is likely to lack the required pressure resistance at deployment. Particularly preferably, the tensile strength of the polyamide fiber is 6.2 to 9.7 cN/dtex.

The polyamide fiber satisfying the mechanical properties described above preferably uses multi-filament yarns produced by adding the copper compound described above to a polyamide containing at least 80 mol % of polyhexamethylene adipamide having a sulfuric acid relative viscosity ($\eta_r$) of 2.5 to 3.3, and melt extrusion spinning the mixture by a spin-draw method, for example.

It is necessary in this case to use the polyamide fiber having a single filament size of 0.5 to 4.5 dtex, more preferably 0.5 to 3.3 dtex. When the single filament size exceeds 4.5 dtex, the resulting base fabric becomes undesirably hard or coarse to obtain a compact air bag having a high stowability property into the casing. The yarn size of the polyamide fiber as the warp and the weft of the woven fabric must be 67 to 250 dtex, preferably 67 to 160 dtex. Here, the term "yarn size" means the sum of the single filament size contained in the yarn forming the woven fabric in the direction of the warp and in the direction of the weft. The fiber that constitutes the warp (or weft) yarn of the weave structure of the woven fabric may be the yarn obtained by twisting, doubling or paralleling a plurality of yarns. When the yarn size in this sense exceeds 250 dtex, the resulting air bag is inferior in the aspect of small weight and compactness and is likely to fail to achieve the object of the present invention. When the yarn size is less than 67 dtex, the mechanical performances required for the bag operation and mechanical properties such as the tensile strength and the tear mechanical property of the base fabric cannot be satisfied.

The base fabric for the air bag according to the present invention can be produced by weaving the polyamide fiber as the warp and the weft on an air jet loom (hereinafter called "AJL") into woven fabric having a weave structure such as a plain weave, a rip stop weave, basket weave or the like. The weaving machine of the polyamide fiber satisfying the yarn size described above by using AJL provides the air bag that can be stowed in the casing while its folded shape is retained as such when the air bag is once folded, has a remarkably smooth surface devoid of any concavo-convexities and having a small coefficient of friction. Therefore, the air bag can deploy smoothly irrespective of its folding method.

In addition, the base fabric for the air bag according to the present invention is excellent in unfolding-back property and has performance of smooth deployment of the air bag. These performances are brought forth by low bending rigidity, excellent bending recovery property and smooth surface characteristics.

In other words, as for easiness of bending, the mean bending rigidity value (B) measured by a pure bending tester (a measurement method in which a woven fabric sample is bent as a whole into an arcuate shape at a predetermined curvature, changes this curvature at a predetermined rate and measures the resulting bending moment) defined in the KES measurement methods exhibits not greater than 5 mN·cm$^2$/cm in both warp and weft directions. The KES measurement methods include several set of measurements of mechanical properties of fabric. This mean bending rigidity is determined by acquiring a curve of reciprocating bending moment—curvature in the direction of surfaces of the fabric in each of the warp and weft directions, calculating the bending rigidity in each of the outward and return trip directions from a gradient of a linear portion in a plotted chart, and calculating their average per a unit width of the woven fabric. The smaller the mean bending rigidity value (B) both in warp and weft directions, the better result can be obtained. When the value is not greater than 5 mN·cm$^2$/cm, the folded shape is small and compact. In this case, the handling workability is good, and folding of the air bag into the compact shape does not cause much trouble.

On the other hand, the bending recovery property of the folded and bent portions, and the surface coarseness and the coefficient of friction of the woven fabric are associated with smooth deployment of the air bag.

In the measurement by the pure bending tester (KES-FB2) of the KES measurement method, the mean bending hysteresis width (2 HB) exhibits a value of not greater than 5 mN·cm/cm both in the warp and weft directions. The mean bending hysteresis width (2 HB) is a value obtained by averaging the hysteresis width of the bending moment per unit width at specific points in reciprocation of the hysteresis curve of bending moment—curvature in the right and left direction, that is, at a point of (curvature+1 cm$^{-1}$ (Kayser)) and at a position of (curvature−1 cm$_{-1}$ (Kayser)). When the mean bending hysteresis width (2 HB) is not greater than 5 mN·cm/cm, the woven fabric is excellent in bending recovery (liveliness) and is free from occurrence of fold mark or crease.

The surface coarseness (SMD) of the woven fabric of the present invention woven on an air jet loom is not greater than 0.07 μm and mean deviation of frictional coefficient in the measurement by the surface tester (KES-FB4) of the KES measurement method. When the mean deviation (MMD) of the coefficient of friction is less than 0.04, the resistance of the folded woven fabric against deployment is small when the air bag deploys. Consequently, the deployment shape does not become non-uniform and the deployment direction is not difficult to be controlled either. When the surface coarseness (SMD) is less than 7 μm, the resistance of the folded woven fabric against its unfolding is small when the folded fabric is spread. Furthermore, the air bag is soft to touch and does not invite abrasion when the air bag deploys.

The KES measurement method for detecting the fabric surface frictional properties uses a designated friction probe, and detects the tension applied to the friction probe, that is, the frictional force, by moving the sample fabric under a static load of the friction probe on which the sample fabric is slided on. Similarly, a designated probe of the KES measurement method is placed on the sample and is moved up and down to measure the surface coarseness. The surface coarseness (SMD) is a mean deviation of vertical displacement, and is outputted by using an electronic circuit.

The texture of the base fabric for the air bag may be any of plain weave, basket weave and rip stop weave, but a rip stop weave is more excellent than the plain weave and the basket weave because it can more easily increase the woven yarn size parameter and air permeability. The number of woven yarns in each of the warp and weft directions when weaving the base fabric is generally and preferably the same in the warp and weft directions, but may well be different by several ends or picks.

When the base fabric is woven, it is preferred that only the yarn for the warp in the warp and the weft forming the woven fabric is composed of interlaced yarn having the number of intermingling points of 25 nodes/m. The greater the number of intermingling points of yarn for the warp, the higher becomes the weavability. The number of intermingling points is 25 nodes/m or more, preferably 30 to 55 nodes/m, when the uncoated air bag base fabric is woven from the fiber having a yarn size of not greater than 250 dtex on an air jet loom. On the other hand, the weft yarn does not receive much abrasion due to the heald and a shuttle in comparison with the warp yarn. Since weft yarn is conveyed by air picking motion, the flying property of the weft yarn becomes higher when the number of intermingling points is smaller.

Accordingly, the number of intermingling points is 5 to 24 nodes/m, though this value is not always essential.

Incidentally, the number of intermingling points of the filaments in the yarn can be determined by counting the number of interlaced nodes because uninterlaced portions of filaments open but the interlaced node portions do not open when the interlaced yarn are placed in water. This term represents the number of intermingling points at which at least 95% of the filaments constituting a yarn is cohered.

When producing the base fabric for air bag according to the present invention, the woven fabric woven as woven (grey fabric) on an air jet loom is directly provided for the end-use without scouring. When the base fabric for air bag according to the present invention is a base fabric for an uncoated air bag, mild heat setting (at 100 to 180° C. for about 20 to about 60 seconds) may be applied so as to remove wrinkle or creases occurred in the woven fabric. However, this heat setting treatment is not necessary when the woven fabric does not have large quantities of wrinkle. When the base fabric for air bag according to the present invention is a base fabric for the coated air bag, heat setting may be applied after coating in the same way as in the case of the base fabric for an uncoated air bag irrespective of the heat setting treatment of the woven fabric.

Air permeability of the base fabric for an uncoated air bag is affected by the cohesiveness of the fiber and its weave density. Therefore, the warp and the weft of a base fabric preferably satisfy the relation such that the product (hereinafter called simply "woven yarn size parameter") of the yarn size (dtex) and the weave density (ends (or picks)/ 2.54 cm) is 10,000 to 20,000, preferably 10,000 to 16,000. In an ultra-high weave density woven fabrics having a woven yarn size parameter of greater than 16,000, stable weaving operation is difficult. When the woven yarn size parameter is less than 1,000, the mechanical properties of the base fabric such as the tensile strength is lowered, and cannot provide the mechanical properties required for the bag at deployment operation.

The woven base fabric formed of copper-containing polyamide fiber is almost free from deterioration in its tensile strength after passed through the accelerated heat resistance test treatment described above. As to tear strength, however, it deteriorates usually to the half of that of a grey woven fabric formed of yearns having a yarn size of not greater than 250 dtex.

In the present invention, at least 0.8 wt % of the oiling agent (percentage of the mass of the oiling agent to the sum of the mass of the woven fabric and the weight of the oiling agent) is applied so as to keep the retention ratio of at least 90% after the heat resistance test. In addition, the flame retarding property is retained. The adhering amount of the oiling agent exceeding 6 wt % is not desirable because the base fabric becomes sticky.

The method of applying the oiling agent includes a method of dipping the woven fabric after weaving and a method in which the oiling agent is applied to the producer's yarns before weaving and uses the woven fabric without scouring. In the present invention, it is preferred that the oiling agent is applied in advance to the weaving yarns before weaving of woven fabric and is allowed to remain adhered in the grey woven fabric to the used as such without scouring. In other words, the woven fabric of the present invention is a non-sized yarn woven fabric which need not be scoured before use in making an air bag and is woven on an air jet loom, not using water. Since the producer's yarn containing 0.5 to 3.0 wt % of the heat resistant lubricating oiling agent is used as such for the warp and the weft, the retention ratio of tear strength can be improved amazingly. Since the adhesion amount of the oiling agent is coincident with the amount of the spin finish oil in spinning process agent ordinarily applied to yarn in the production of the yarns, the weaving yarns can be used extremely advantageously. Therefore, the adhered amount of the oiling agent may well be smaller in comparison with the case where a oiling agent is applied after scouring.

In case where the heat resistant lubricating oiling agent is used as the spin finish oil to be imparted at the stage of fiber production, a preferred use of dialkylthio-dipropionate is made as the principal component. In this case it is preferred to use a PO/EO alkyl trialkyl ester polyether and an emulsifier of a POE hardened castor oil in combination with the principal component at a mixing ratio of 40 wt %.

To improve weavability, a method using a warping oil agent may well be employed. When the warping oil agent is applied to the warp yarns, within the range of the adhered amount of the oiling agent described above, preferably 0.5 to 5.0% by weight of warping oil agent based on the weight of warp yarn. In consequence, the adhesion ratio of the oiling agent to weaving yarn is different in some cases between the warp and the weft. In the present invention, the oiling agent adhesion ratio is equal with the warp yarn and with the weft yarn or preferably greater with the warp yarn than with the weft yarn. In the latter case, the amount is preferably greater by 0.1 wt % or more.

The warping oil agent in the present invention is preferably a heat resistant oiling agent having a heat loss difference hereinafter described of 2% or more and capable of preventing clouding of the window glass of the car when it is applied to a base fabric for air bag. Specifically, the warping oil agent preferably consists of a mineral oil having a high ignition point, a synthetic paraffin or glycerin ester as the major components. The heat loss ratio difference described above is determined in the following way. Two specimen of one gram of each sample of the oil agent precisely weighed are prepared on an aluminum dish having a diameter of 6 cm. These two specimen are heated on hot plates at 120° C. and 150° C. for 10 minutes, respectively. The weight of each sample is measured, and the difference of the loss ratios of the oiling agents at 120° C. and 150° C. is calculated. Further, an antibacterial agent may be added to the warping oil agent to prevent getting mildew when the woven fabric is left standing for a long time. The kind and the addition amount of the antibacterial agent are not limited provided that the antibacterial agent does not impede stability of the warping oiling agent. It is preferred to add 0.02 to 0.5 wt % of a mixture of isothiazolone chloride, isothiazone and bromonitrile alcohol.

When weaving a base fabric for air bag, it is preferred to use twisted yarns to ensure desired weaving property when the oiling agent adhesion ratio for obtaining cohesion property yarn and smoothness to the warp yarn is less than 1.0 wt %. When twist is imparted, a twist multiplier (size$^{1/2}$× number of twists) is preferably 5,000 or less yarn so as to avoid occurrence of snarl resulting from twisting.

BEST MODE FOR CARRYING OUT THE INVENTION

Hereinafter, the present invention will be explained more concretely with reference to examples thereof.

Figure 6:
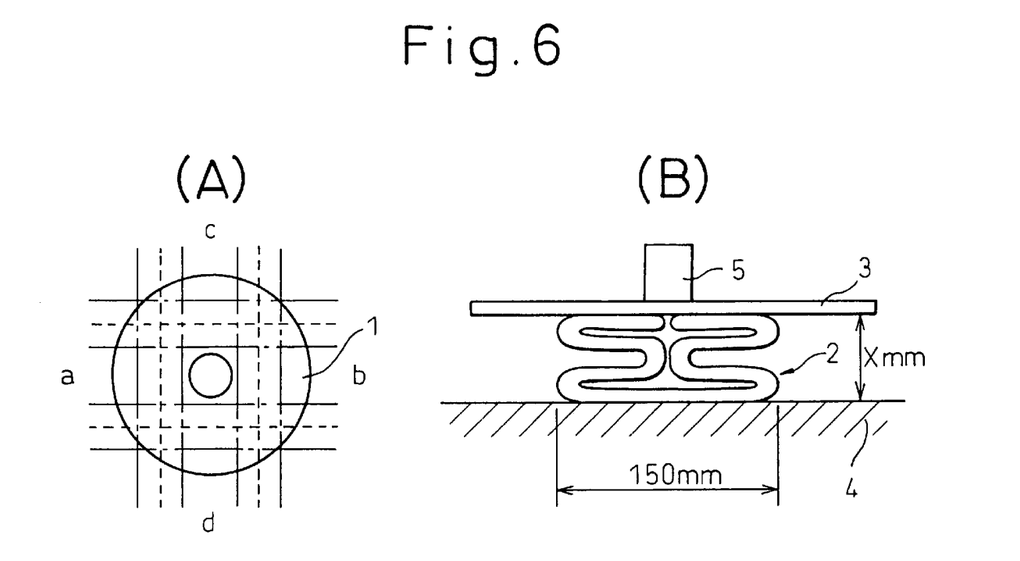
FIG. 6 is an explanatory view of a folding method of an air bag and a measurement method for its folding thickness.

Incidentally, fibers and a base fabric for an air bag used in Examples are evaluated by the following method.
1. Tensile strength of yarn (cN/dtex):
    According to JIS L-1013
2. Tensile elongation of yarn (%):
    According to JIS-L-1013
3. Weave density (ends or picks/2.54 cm):
    According to JIS L-1096
4. Metsuke (basis of weight of fabric weight per unit area of fabric) of woven fabric (g/m$^2$):
    According to JIS L-6328
5. Thickness of woven fabric ($\mu$m):
    According to JIS L-6328
6. Tear strength of woven fabric (N):
    According to JIS L-6328 (single tongue tear testing method)
7. Air permeability of woven fabric (cm$^3$/cm$^2$/sec):
    According to JIS L-1096.8.27.1A (Frazier method, pressure difference 12.7 mm water column)
8. Residual oil content of woven fabric (%):
    According to JIS L-1096 (hexane extraction method)
9. Flame resistance (mm/min):
    According to FMVSS302 method
10. Heat resistance test of woven fabric:
    Tear strength is measured after a fabric is treated at 120° C. in a hot air oven for 400 hours.
11. Mean bending rigidity of KES (B) and mean bending hysteresis width (2 HB):
    Measured by using a pure bending test under standard condition with the exception of a base fabric width of 5 cm (length: 10 cm) (The Standardization and Analysis of Hand Evaluation, 2$^{nd}$ Ed.: S. Kawabata, The Textile Machinery Society of Japan, 1980).
12. Surface coarseness (SMD) of KES and mean deviation of coefficient of friction (MMD):
    Measured by using a surface tester (KES-FB4) under a standard condition at a base fabric having a width of 20 cm (length: 20 cm).
13. Deployment behavior of air bag (high-speed VTR observation):
    A driver's bag (60 liters) is sewn in accordance with the description of WO99/28164 and is integrated into a module with an inflator (non-azide type, maximum tank pressure of 185 kPa). A deployment test is conducted at room temperature. The deployment state is recorded by using a high-speed VTR. The deployment state from 15 msec to 50 msec is observed and is evaluated with reference to the following standard. Samples that uniformly deploy into a circular deployment shape as viewed from the front surface are evaluated as uniform deployment. Samples that become non-circular deployment during the deployment process are evaluated as non-uniform deployment.
    ○: uniform deployment (examples shown in FIGS. 1 & and 2)
    X: non-uniform deployment (examples shown in FIGS. 3 and 4)
14. Compactness of air bag (air bag thickness in folded state):
    The air bag (1) is folded into the zigzag shape along a center line (c)–(d) while the edge (a) and the edge (b) are put together, and the portion (c) and (d) is further folded into the zigzag shape along a center line (a)–(b) into a package of 150 mm square (2). Next, the folded air bag is put on a flat surface of table (4) as shown in FIG. 6(B), and a glass plate (3) of 300 mm square is put on the folded air bag. Further, a weight (5) of 1 kg is placed and 30 minutes later, a mean thickness X is measured.
15. Retention performance of folded air bag:
    A load of 200 g of the glass plate and a load weight is placed on the folded air bag (2) in the same way as the evaluation method of testing item No. 14 and five minutes later, the load is removed. The folded packages which open due to unfolding-back repulsion and whose the 150 mm square swells out are evaluated as having poor folding retention performance (x) and the packages whose 150 mm square area does not swell out are evaluated as having good folding retention performance (o).

16. Heat resistant deployability:

Each air bag module prepared in the same way as in the air bag deployment behavior test of the evaluation method of testing item No. 13 is left standing at 105° C. for 400 hours, and is then subjected similarly to the deployment test to examine the occurrence or absence of breakage of the air bag.

EXAMPLE 1

Polyhexamethylene adipamide (nylon 66) chips having a 95.5% $H_2SO_4$ relative viscosity $\eta_r$ of 2.95, not containing titanium oxide but containing 70 ppm, calculated as copper in the polymer, of a 1:12 (weight ratio) mixture of copper iodide and potassium iodide and were melt-spun by an extruder type spinning machine. After a spin finish oil was applied to the extruded yarn, the yarn was heat stretched to obtain a yarn consisting of 68 filaments having a tensile strength of 7.1 cN/dtex, a tensile elongation of 21%, a boiling water shrinkage ratio of 7.5%, a number of intermingling point of 35 nodes/m, a spin finish oil adhesion ratio of 1.0 wt % and a yarn size of 155 dtex (single filament size: 2.3 dtex).

The spin finish oil was a 22% emulsion solution consisting of 40 parts of dialkylthio dipropinate. The above-mentioned spin finish oil was composed of 40 parts of dialkylthio dipropionate, 30 parts of PO/EO alkylpolyether, 30 parts of trialkyl ester of POE hardened castered oil. The spin finish oil was adhered to the extruded yarn in an 22% emulsified solution by means of oiling nozzle method.

When 1,200 ends of the yarn were warped, a warping oil S560 (consisting of 27 parts of mineral oil, 28 parts of natural fat, 28 parts of fatty acid ester, 12 parts of higher alcohol and 5 parts of anionic surface active agent(product of Goo Chemical Co., LTD.) a loss difference of 1.3% at 150° C. and 120° C.) was applied to the yarn in a wrapping oil adhesion ratio of 1.0 wt % at room temperature by a kiss-roll. Warping such as beaming was conducted. For the warp yarn, a yarn having the number of intermingling points of 11 nodes/m and the properties described above were used. The yarn were woven on an air jet loom to obtain a woven fabric having a weaving density (warp×weft) of 83 ends×83 picks/2.54 cm.

The resulting woven fabric was subjected to a heat setting finish at 150° C. without scouring to obtain a base fabric for an air bag. The base fabric have a weave density of 83 ends×83 picks/2.45 cm and an air permeability of 0.8 $cm^3/cm^2$/sec at a water column height of 12.7 mm in this example. The base fabric was then subjected to a heat resistance test. Table 1-1 tabulates the properties of the yarns used in this example, the evaluation result of the woven fabric and the deployment test of an air bag obtained by sewing the base woven fabric.

EXAMPLE 2

A base fabric for an air bag of this example was obtained in exactly the same way as in Example 1 with the exception that the warping oil adhesion ratio was changed to 3.0 wt %. Table 1-1 tabulates the evaluation result of the woven fabric and the deployment test result of the bag obtained by sewing the woven fabric.

EXAMPLE 3

Polyhexamethylene adipamide (nylon 66) chips similar to those used in Example 1 were melt spun. A spin finish oil used was a 30% straight diluted solution (diluent: mineral oil, 28 sec) of an oiling agent (consisting of 60 parts of dialkylthio dipropinate, 20 parts of PO/EO alkyl polyether and 20 parts of POE hardened castor oil trialkyl ester). After the oiling agent was adhered to the extruded yarn by the nozzle oiling method, the yarns were heat stretched to obtain a yarn consisting of 68 filaments having a strength of 7.1 cN/dtex, elongation of 24% with a boiling water shrinkage ratio of 7.5%. The yarn had the number of intermingling points of 42 nodes/m, a spin finish oil adhesion ratio of 0.8 wt % and the yarn size of 155 dtex (single filament size: 2.3 dtex).

An S twist of 300 t/m was imparted to the warp yarn by a twisting machine and warping such as beaming was carried out without applying the warping oil. Yarns having the properties described above, and only difference being the number of intermingling points of 10 nodes/m, were woven on an air jet loom to obtain a grey woven fabric having a weaving density of 83 ends×83 picks/2.54 cm.

The woven fabric was subjected to heat setting finish at 120° C. without scouring to obtain a base fabric for an air bag according to this example. The base fabric had a weaving density of 83 ends×83 picks/2.54 cm and an air permeability of 0.8 $cm^3/cm^2$/sec at a water column height of 12.7 mm. Table 1-1 tabulates the evaluation result of the woven fabric and the deployment test result of the bag obtained by sewing the woven fabric.

EXAMPLES 4 AND 5

Polyhexamethylene adipamide (nylon 66) chips similar to those used in Example 1 were melt spun to produce yarns having different yarn sizes, tensile strength and tensile elongation as tabulated in Table 1. Weaving and heat setting finish were carried out by use of the same warp oil as the one used in Example 1 to obtain base fabrics for uncoated air bags. Table 1-1 tabulates the evaluation result of the resulting woven fabrics and the deployment test results of the air bags obtained by sewing the woven fabrics.

EXAMPLE 6

Polyhexamethylene adipamide (nylon 66) chips having a 95.5% $H_2SO_4$ relative viscosity $\eta_r$ of 2.95 containing 15 ppm, calculated as copper in the polymer, of a 1:60 (weight ratio) mixture of copper iodide and potassium iodide as a copper type heat stabilizer were melt-spun by an extruder type spinning machine. After the same spin finish oil as that of Example 3 was applied to the spun yarn, the yarn was heat stretched at 200° C. to obtain a filamentary yarn consisting of 48 filaments having a tensile strength of 8.0 cN/dtex, a tensile elongation of 26%, a boiling water shrinkage ratio of 7.5%, number of intermingling points of 32 nodes/m, a spin finish oil adhesion ratio of 1.0 wt % and a yarn size of 155 dtex (single filament size: 3.2 dtex).

When the yarns were warped, a warping oil S1700 consisting of synthetic wax type NSY (Non-Sizing-Yarn Type) oiling agent; product of Goo Chemical Co., LTD.; a loss difference of 0.7% at 150° C. and 120° C.) was applied to the yarns in an oil adhesion ratio of 0.9 wt % at 80° C. by a kiss-roll. Warping such as beaming was carried out. Using the warped yarn as described above and yarn having the number of intermingling points of 32 nodes/m and the properties described above for the weft, a woven fabric having a weaving density (warp×weft) of 89 ends×89 picks/ 2.54 cm was obtained.

The woven fabric was subjected to heat set at 150° C. without scouring to obtain a base fabric for an uncoated air bag according to this example, that had a weaving density of 91 ends×91 picks/2.54 cm and an air permeability of 0.2 cm$^3$/cm$^2$/sec at a water column height of 12.7 mm was obtained. Table 1-2 tabulates the evaluation result of the woven fabric and the deployment test result of an air bag obtained by sewing the woven fabric.

EXAMPLE 7

Polyhexamethylene adipamide (nylon 66) chips having a 95.5% H$_2$SO$_4$ relative viscosity $\eta_r$ of 2.95, containing 30 ppm, calculated as a copper in the polymer, of a 1:27 (weight ratio) mixture of copper iodide and potassium iodide as a copper type heat stabilizer were melt-spun by using the same equipment and under the same condition as in Example 6 to obtain a filamentary yarn and a woven fabric. Table 1-2 tabulates the evaluation result of the woven fabric and the deployment test result of the bag obtained by sewing the woven fabric.

EXAMPLE 8

Polyhexamethylene adipamide (nylon 66) chips 95.5% H$_2$SO$_4$ relative viscosity $\eta_{rel}$ of 2.95 containing 65 ppm, calculated as a copper in the polymer, of a 1:12 (weight ratio) mixture of copper iodide and potassium iodide as a copper type heat stabilizer and having a were melt-spun by using the same equipment and under the same condition as in Example 6 to obtain the filamentary yarn and a woven fabric. Table 1-2 tabulates the evaluation result of the woven fabric and the deployment test result of the bag obtained by sewing the woven fabric.

EXAMPLE 9

Yarns each consisting of 72 filaments and having a yarn size of 235 dtex, a tensile strength of 8.0 cN/dtex, a tensile elongation of 27%, a boiling water shrinkage ratio of 7.5%, number of intermingling points of 20 nodes/m and a spin finish oil adhesion ratio of 1.0 wt % were produced by using the same chips, the same spinning equipment and the same oiling agent as those used in Example 8. To the yarn was applied 0.9 wt % of a warping oil, S1700, at 80° C. by the kiss-roll system, and warping preparation such as beaming was carried out. A woven fabric having a weaving density (warp×weft) of 71 ends×71 picks/2.54 cm was obtained.

This woven fabric was subjected to heat setting finish at 150° C. without scouring to obtain a base fabric for uncoated air bag according to this example. The base fabric has a weaving density of 73 ends×73 picks/2.54 cm and an air permeability of 0.2 cm$^3$/cm$^2$/sec at a water column height of 12.7 mm was obtained. Table 1-2 tabulates the properties of the yarn used in this example, the evaluation result of the resulting woven base fabric and the deployment test result of a bag obtained by sewing the woven fabric.

COMPARATIVE EXAMPLE 1

A base fabric for uncoated air bag was obtained in the same way as in Example 3 by using the same polyhexamethylene adipamide (nylon 66) chips and spin finish oil, the same properties and the same weaving condition as those of Example 3 with the exception that the spin finish oil adhesion ratio was 0.6 wt %. Table 2-1 tabulates the heat resistance test evaluation result of the base fabric for the uncoated air bag.

COMPARATIVE EXAMPLE 2

A base fabric for an air bag of this Comparative Example was produced by using a yarn having a size of 155 dtex/68 filaments having a tensile strength of 7.2 cN/dtex and a tensile elongation of 20% in exactly the same way as in Example 1 with the exception that polyhexamethylene adipamide (nylon 66) chips used did not contain a copper type heat stabilizer and had a 95.5% H$_2$SO$_4$ relative viscosity $\eta_r$ of 2.95. The base fabric was subjected to the heat resistance test. Table 1-2 tabulates the evaluation result of the woven fabric.

COMPARATIVE EXAMPLE 3

Polyhexamethylene adipamide (nylon 66) chips similar to those used in Example 1 were melt-spun to produce yarns consisting of 470 dtex/70 filaments having a tensile strength of 8.2 cN/dtex, a tensile elongation of 19% and number of intermingling point of 30 nodes/m. After 4% of an acrylic sizing agent was allowed to adhere onto the yarn, weaving of the yarns was carried out in a weaving density (warp× weft) of 51 ends×52 picks/inch on a water jet loom. After scouring the gray fabric in an open soaper, washing with water, drying and heat setting were conducted, a base fabric for an air bag according to this example, having a weaving density of 53 ends×53 picks/inch and air permeation of 0.7 cm$^3$/cm$^2$/sec at a water column height of 12.7 mm, was obtained, and was then subjected to the heat resistance test. Table 2-1 tabulates the evaluation result.

COMPARATIVE EXAMPLE 4

Polyhexamethylene adipamide (nylon 66) chips similar to those used in Example 1 were melt-spun to produce yarns consisting of 70 filaments with a size of yarn being 470 dtex which yarns have a tensile strength of 8.2 cN/dtex, a tensile elongation of 19%, and a number of intermingling points of 30 nodes/m. Warp preparation such as beaming was conducted without applying any warping oil, and a woven fabric having a weaving density of 52 ends×53 picks/inch was obtained by weaving on an air jet loom. This woven fabric was subjected to heat set finish at 150° C. without scouring. A base fabric for an air bag according to this comparative example, having a weaving density of 53 ends×53 picks/ 2.54 cm and an air permeability of 0.6 cm$^3$/cm$^2$/sec at a water column height of 12.7 mm, was obtained. The fabric was then subjected to the heat resistance test. Table 2-1 tabulates the test result.

COMPARATIVE EXAMPLE 5

This comparative example used the same warp yarns as the warp yarns used in Example 1, and 5 wt % of an acrylic sizing agent RJ50A (a product of Goo Chemical Co., LTD.) was applied to the warp yarn. Warp preparation such as beaming was conducted, and a woven fabric having a weaving density (warp×weft) of 83 ends×89 picks/2.54 cm was obtained by using the yarns for both the warp and the weft on an air jet loom. After alkali scouring and drying were conducted, the woven fabric was heat set at 150° C. and a base fabric for uncoated air bag having a weaving density of 85 ends×90 picks/2.54 cm and an air permeability of 0.4 cm$^3$/cm$^2$/sec pressure at a water column of 12.7 mm.

Table 2-2 tabulates the properties of the yarn used, the evaluation result of the woven fabric and the deployment test result of an air bag obtained by sewing the woven fabric.

COMPARATIVE EXAMPLE 6

A woven fabric was produced by using the same yarn and the same weaving method as in Comparative Example 5 and was then subjected to alkali scouring and drying. The woven fabric was immersed in the same 10 wt % emulsion bath of the warping oil as used in Example 1. A mangle was used to squeeze the emulsion solution and drying was conducted. The woven fabric was then subjected to heat setting at 150° C. to obtain a base fabric for a uncoated air bag having a weaving density of 85 ends×90 picks/2.54 cm and an air permeability of 0.4 cm$^3$/cm$^2$/sec at a water column height of 12.7 mm. The base fabric was subjected to the heat resistance test for evaluation.

Table 2-2 tabulates the properties of the yarn used in this comparative example, the evaluation result of the resulting woven fabric and the deployment test result of an air bag obtained by sewing the ground fabric.

COMPARATIVE EXAMPLE 7

S twist of 300 t/m was imparted to the warp yarn used in Example 1 and a warping machine, and the warping oil as used in Example 1 was further applied to the yarns at a warp adhesion ratio of 1.0 wt %. Warping preparation such as beaming was conducted. A woven fabric having a weaving density (warp×weft) of 83 ends×89 picks/2.54 cm was produced by weaving the yarn for the warp and the weft on a water jet loom. Further, the woven fabric was dried at 120° C. without scouring, and was subjected to heat setting treatment at 150° C. There was thus obtained a base fabric for an uncoated air bag having a weaving density of 85 ends×90 picks/2.54 cm and an air permeability of 0.4 cm$^3$/cm$^2$/sec at pressure a water column of 12.7 mm. The base fabric was subjected to the heat resistance test for evaluation.

Table 2-2 tabulates the properties of the yarn used in this comparative example, the evaluation result of the resulting woven fabric and the deployment test result of an air bag obtained by sewing the base fabric.

The following can be understood from Tables 1-1, 1-2, 2-1 and 2-2. Comparative Example 1 represents the case where a oiling agent adhesion ratio of yarn is less than 0.8 wt %, the tear strength retention ratio is somewhat low after the heat resistance test, and the base fabric for air bag cannot exhibit sufficient mechanical properties.

Comparative Example 2 represents the case where the fiber constituting the base fabric does not contain copper as a heat stabilizer. In this case, the decrease in tear strength retention ratio is greater than in Comparative Example 1, and the base fabric for air bag lacks durability.

Comparative Example 3 represents the case where a size of yarn used greatly exceeds 250 dtex of the present invention, and the oiling agent adhered to base fabric is removed by scouring. In this case, tear strength retention ratio after the heat resistance test is by far lower than in Examples 1 to 9, the folding height is high, the mean bending rigidity (B) of KES is high, compactness is low, all of the mean bending hysteresis width (2 HB), the surface coarseness (SDM) of KES and the standard deviation (MMD) of the coefficient of friction are high, and deployment of air bag lacks uniform shape. Thus the base fabric is inferior to the products of the present invention.

Comparative Example 4 represents the case where the yarn size is greater in the same way as in Comparative Example 3 and the spin finish oil adhered to yarn is left unremoved as such because scoring was eliminated. This case, too, is inferior to the present invention in the same way as in Comparative Example 3.

Comparative Example 5 represents the case where the acrylic sizing agent is applied to the warp yarn at the time of warping and weaving is conducted on a water jet loom and the woven fabric is subjected to scouring and heat set treatment. Though this product is excellent in compactness, folded shape retaining property and deployability, the oiling agent once adhered to yarn almost removed from the base fabric as scouring is conducted, hence the residual oil content is small, the tear strength retention ratio is greatly decreased after the heat resistance test and the bag undergoes rupture in the deployment test of air bag after the heat resistance test.

Comparative Example 6 represents the case where the acrylic sizing agent is allowed to adhere to the warp at the time of warping and weaving is carried out by on a water jet loom, and the woven fabric is scoured and is then dipped into the oiling agent emulsion for re-adhesion of the oiling agent. The woven fabric is excellent in compactness and folded shape retaining property and deployability. However, the FMVSS302 flame retarding property is not satisfactory though a considerable amount of the oiling agent is applied by dipping and though the decrease in the tear strength retention ratio after the heat resistance test does not occur.

Comparative Example 7 represents the case where the woven fabric is produced by using a water jet loom without applying the oiling agent to the warp yarn, drying and heat set treatment without scouring. Though the woven fabric is excellent in compactness, folded shape retaining property and deployability, the tear strength retention ratio greatly decreases after the heat resistance test because the oiling agent adhering to the yarns due to water during weaving and the residual oil content is small. In consequence, the bag undergoes rupture in the expansion test of air bag after the heat resistance test.

TABLE 1-1

| Weaving yarn for base fabric (warp/weft) | Example 1 warp/weft | Example 2 warp/weft | Example 3 warp/weft | Example 4 warp/weft | Example 5 warp/weft |
|---|---|---|---|---|---|
| Yarn used for woven fabric | | | | | |
| Polymer (H$_2$SO$_4$ relative viscosity η$_r$) | N66(2.95) | N66(2.95) | N66(2.95) | N66(2.95) | N66(2.95) |
| Copper content (ppm) | 70 | 70 | 70 | 70 | 70 |
| Yarn size (dtex) | 155 | 155 | 155 | 78 | 155 |
| Number of filaments (f) | 68 | 68 | 68 | 34 | 68 |
| Tensile strength (cN/dtex) | 7.1 | 7.1 | 7.1 | 7.1 | 6.3 |
| Tensile elongation (%) | 21 | 21 | 24 | 22 | 24 |
| Number of intermingling points/m | 35/11 | 35/11 | 42/10 | 40/10 | 35/11 |
| Adhesion ratio of heat | 1.0/1.0 | 1.0/1.0 | 0.8/0.8 | 1.0/1.0 | 1.0/1.0 |

TABLE 1-1-continued

| Weaving yarn for base fabric (warp/weft) | Example 1 warp/weft | Example 2 warp/weft | Example 3 warp/weft | Example 4 warp/weft | Example 5 warp/weft |
|---|---|---|---|---|---|
| resistant lubricating oiling agent (%) | | | | | |
| Warp | | | | | |
| Twisted yarn | | | | | |
| No. of twists (t/m) | nil | nil | S-300 | S-400 | nil |
| Warping oil agent | | | | | |
| Kind of oiling agent | S560 | S560 | nil | S560 | S560 |
| Adhesion ratio (%) | 1.0 | 3.0 | nil | 2.0 | 1.0 |
| Woven fabric | | | | | |
| Size (dtex) | 155/155 (155/155) | 155/155 (155/155) | 155/155 (155/155) | 78/78 (78/78) | 155/155 (155/155) |
| Weave density (ends or picks/2.54 cm) | 83/83 | 83/83 | 83/83 | 142/140 | 86/89 |
| Woven yarn size parameter/2.54 cm** | 12665/12665 | 12865/12865 | 12865/12865 | 11076/10920 | 13330/13795 |
| Weaving loom | AJL | AJL | AJL | AJL | AJL |
| Scouring | without scouring | without scouring | without scouring | without scouring | without scouring |
| Thickness (μm) | 175 | 175 | 175 | 156 | 175 |
| Basis of weight (g/m²) | 109 | 110 | 109 | 91 | 126 |
| Air permeability (cm³/cm²/sec) | 0.6 | 0.6 | 0.6 | 0.4 | 0.8 |
| Residual oil content (%) | 1.4 | 2.3 | 0.6 | 1.8 | 1.4 |
| After heat resistance test | | | | | |
| Tear | | | | | |
| Strength (N) | 73/74 | 75/76 | 75/75 | 27/29 | 57/60 |
| Retention ratio (%) | 114/107 | 120/115 | 120/120 | 105/110 | 127/121 |
| FMVSS302 combustion | self-extinguished | self-extinguished | self-extinguished | self-extinguished | self-extinguished |
| Tensile strength (cN/dtex)* | 6.4/6.5 | 6.4/6.5 | 6.4/6.5 | 6.4/6.5 | 5.7/5.8 |
| Folding height (mm) | 1.4 | 1.5 | 1.4 | 1.7 | 1.5 |
| Mean bending rigidity (B) | 2.5/1.8 | 2.4/1.7 | 2.5/1.8 | 1.8/3.0 | 1.9/4.2 |
| Mean bending hysteresis width (2HB) | 1.8/1.5 | 2.7/1.6 | 2.8/1.5 | 1.9/2.3 | 2.0/4.6 |
| Surface coarseness (SDM) | 6.5/3.5 | 6.3/3.4 | 6.5/3.6 | 3.1/2.4 | 6.6/3.1 |
| Standard deviation of frictional coefficient (MMD) | 0.011/0.011 | 0.010/0.009 | 0.011/0.010 | 0.010/0.020 | 0.010/0.0010 |
| Bag | | | | | |
| Compactness (mm) | 15 | 15 | 15 | 15 | 15 |
| Folded shape retaining property | ○ | ○ | ○ | ○ | ○ |
| Expansibility | ○ | ○ | ○ | ○ | ○ |
| Heat resistant expansion | ○ | ○ | ○ | ○ | ○ |

*tensile strength of warp/weft directions of woven fabric N66 represents polyhexamethylene adipamide
**(dtex · end/2.54 cm/dtex · pick/2.54 cm)

TABLE 1-2

| Weaving yarn for base fabric (warp/weft) | Example 6 warp/weft | Example 7 warp/weft | Example 8 warp/weft | Example 9 warp/weft |
|---|---|---|---|---|
| Yarn used for woven fabric | | | | |
| Polymer (H₂SO₄ relative viscosity η_r) | N66(2.95) | N66(2.95) | N66(2.95) | N66(2.95) |
| Copper content (ppm) | 15 | 30 | 65 | 65 |
| Yarn size (dtex) | 155 | 155 | 155 | 235 |
| Number of filaments (f) | 48 | 48 | 48 | 72 |
| Tensile strength (cN/dtex) | 8.0 | 8.0 | 8.0 | 8.0 |
| Tensile elongation (%) | 26 | 27 | 26 | 27 |
| Number of intermingling points/m | 32/32 | 32/32 | 32/32 | 30/30 |

TABLE 1-2-continued

| Weaving yarn for base fabric (warp/weft) | Example 6 warp/weft | Example 7 warp/weft | Example 8 warp/weft | Example 9 warp/weft |
|---|---|---|---|---|
| Adhesion ratio of heat resistant lubricating oiling agent (%) | 1.0/1.0 | 1.0/1.0 | 1.0/1.0 | 1.0/1.0 |
| Warp Twisted yarn | | | | |
| No. of twists (t/m) | nil | nil | nil | nil |
| Warping oil agent | | | | |
| Kind of oiling agent | S1700 | S1700 | S1700 | S1700 |
| Adhesion ratio (%) | 0.9 | 0.9 | 0.9 | 0.9 |
| Woven fabric | | | | |
| Size (dtex) | 156/155 (156/155) | 155/155 (155/155) | 155/155 (155/155) | 235/235 (235/235) |
| Weave density (ends or picks/2.54 cm) | 91/91 | 91/91 | 91/91 | 73/73 |
| Woven yarn size parameter/2.54 cm** | 14105/14105 | 14105/14105 | 14105/14105 | 17155/17155 |
| Weaving loom | AJL | AJL | AJL | AJL |
| Scouring | without scouring | without scouring | without scouring | without scouring |
| Thickness ($\mu$m) | 197 | 196 | 198 | 220 |
| Basis of weight (g/m$^2$) | 120 | 120 | 120 | 155 |
| Air permeability (cm$^3$/cm$^2$/sec) | 0.2 | 0.2 | 0.2 | 0.2 |
| Residual oil content (%) | 1.4 | 1.4 | 1.4 | 1.4 |
| After heat resistance test Tear | | | | |
| Strength (N) | 62/67 | 65/70 | 60/64 | 100/104 |
| Retention ratio (%) | 106/109 | 110/110 | 110/110 | 100/102 |
| FMVSS302 combustion | self-extinguished | self-extinguished | self-extinguished | self-extinguished |
| Tensile strength (cN/dtex)* | 6.6/6.9 | 6.6/6.9 | 6.6/6.9 | 6.6/6.9 |
| Folding height (mm) | 2.1 | 2.1 | 2.1 | 3.3 |
| Mean bending rigidity (B) | 2.0/4.0 | 1.8/4.0 | 1.9/4.0 | 3.2/4.9 |
| Mean bending hysteresis width (2HB) | 1.9/4.4 | 2.0/4.6 | 1.8/4.0 | 3.0/4.8 |
| Surface coarseness (SDM) | 6.7/2.6 | 6.6/2.5 | 6.6/2.4 | 6.8/4.0 |
| Standard deviation of frictional coefficient (MMD) | 0.010/0.010 | 0.010/0.010 | 0.010/0.010 | 0.025/0.026 |
| Bag | | | | |
| Compactness (mm) | 15 | 15 | 15 | 15 |
| Folded shape retaining property | ○ | ○ | ○ | ○ |
| Expansibility | ○ | ○ | ○ | ○ |
| Heat resistant expansion | ○ | ○ | ○ | ○ |

*tensile strength of warp/weft directions of woven fabric N66 represents polyhexamethylene adipamide
**(dtex · end/2.54 cm$^2$/dtex · pick/2.54 cm$^2$)

TABLE 2-1

Comparative Examples

| Weaving yarn for base fabric (warp/weft) | Example 1 warp/weft | Example 2 warp/weft | Example 3 warp/weft | Example 4 warp/weft |
|---|---|---|---|---|
| Yarn used for woven fabric | | | | |
| Polymer (H$_2$SO$_4$ relative viscosity $\eta_r$) | N66(2.95) | N66(2.95) | N66(2.95) | N66(2.95) |
| Copper content (ppm) | 70 | 0 | 70 | 70 |
| Yarn size (dtex) | 155 | 155 | 470 | 470 |
| Number of filaments (f) | 68 | 68 | 70 | 70 |

TABLE 2-1-continued

Comparative Examples

| Weaving yarn for base fabric (warp/weft) | Example 1 warp/weft | Example 2 warp/weft | Example 3 warp/weft | Example 4 warp/weft |
|---|---|---|---|---|
| Tensile strength (cN/dtex) | 7.1 | 7.1 | 8.2 | 8.2 |
| Tensile elongation (%) | 21 | 21 | 19 | 19 |
| Number of intermingling points/m) | 35/11 | 35/11 | 30/30 | 30/30 |
| Adhesion ratio of heat resistant lubricating oiling agent (%) | 0.6/0.6 | 1.0/1.0 | 1.0/1.0 | 1.0/1.0 |
| Warp Twisted yarn | | | | |
| No. of twists (t/m) | S-300 | nil | nil | nil |
| Warping oil agent | | | | |
| Kind of oiling agent | nil | S560 | nil | nil |
| Adhesion ratio (%) | nil | 1.0 | nil | nil |
| Woven fabric | | | | |
| Size (dtex) | 155/155 (155/155) | 155/155 (155/155) | 470/470 (470/470) | 470/470 (470/470) |
| Weave density (ends or picks/2.54 cm) | 83/83 | 83/83 | 53/53 | 53/53 |
| Woven yarn size parameter/2.54 cm** | 12865/12865 | 12865/12865 | 24910/24910 | 24910/24910 |
| Weaving loom | AJL | AJL | AJL | AJL |
| Scouring | without scouring | without scouring | with scouring | without scouring |
| Thickness (μm) | 175 | 175 | 320 | 320 |
| Basis of weight (g/m²) | 109 | 123 | 210 | 210 |
| Air permeability (cm³/cm²/sec) | 0.6 | 0.8 | 0.7 | 0.6 |
| Residual oil content (%) | 0.4 | 1.4 | 0.1 | 0.9 |
| After heat resistance test Tear | | | | |
| Strength (N) | 48/49 | 25/27 | 190/189 | 261/257 |
| Retention ratio (%) | 75/75 | 40/41 | 80/80 | 110/108 |
| FMVSS302 combustion | self-extinguished | self-extinguished | self-extinguished | 204 mm/min |
| Tensile strength (cN/dtex)* | 6.3/6.4 | 3.2/3.3 | 7.7/7.8 | 7.7/7.8 |
| Folding height (mm) | 1.4 | 1.4 | 6.0 | 5.9 |
| Mean bending rigidity (B) | 2.5/1.7 | 2.5/1.7 | 6.9/6.8 | 5.1/13.0 |
| Mean bending hysteresis width (2HB) | 2.8/1.6 | 2.7/1.5 | 5.6/5.9 | 5.2/10.5 |
| Surface coarseness (SDM) | 6.5/3.5 | 6.4/3.5 | 12.5/5.4 | 12.7/6.4 |
| Standard deviation of frictional coefficient (MMD) | 0.011/0.011 | 0.011/0.011 | 0.060/0.050 | 0.060/0.050 |
| Bag | | | | |
| Compactness (mm) | 15 | 15 | 31 | 31 |
| Folded shape retaining property | ○ | ○ | X | X |
| Expansibility | ○ | ○ | X | X |
| Heat resistant expansion | rupture | rupture | ○ | ○ |

*tensile strength of warp/weft directions of woven fabric N66 represents polyhexamethylene adipamide
**(dtex · end/2.54 cm/dtex · pick/2.54 cm)

TABLE 2-2

Comparative Examples

| Weaving yarn for base fabric (warp/weft) | Example 5 warp/weft | Example 6 warp/weft | Example 7 warp/weft |
|---|---|---|---|
| Raw filaments used for woven fabric | | | |
| Polymer ($H_2SO_4$ relative viscosity $\eta_r$) | N66(2.95) | N66(2.95) | N66(2.95) |
| Copper content (ppm) | 70 | 70 | 70 |
| Yarn size (dtex) | 155 | 155 | 155 |
| Number of filaments (f) | 68 | 68 | 68 |
| Tensile strength (cN/dtex) | 7.1 | 7.1 | 7.1 |
| Tensile elongation (%) | 21 | 21 | 21 |
| Number of intermingling points/m | 35/35 | 35/35 | 35/35 |
| Adhesion ratio of heat resistant smoothing agent (%) | 1.0/1.0 | 1.0/1.0 | 1.0/1.0 |
| Warp | | | |
| Twisted yarn | | | |
| No. of twists (t/m) | nil | nil | nil |
| Sizing agent | | | |
| Adhesion ratio (%) | 5 | 5 | S560 (1.0%) |
| Woven fabric | | | |
| Yarn size (dtex) | 155/155 (155/155) | 155/155 (155/155) | 155/155 (155/155) |
| Weave density (ends or picks/2.54 cm) | 85/90 | 85/90 | 85/90 |
| Woven yarn size parameter/2.54 cm** | 13175/13950 | 13175/13950 | 13175/13950 |
| Weaving loom | WJL | WJL | WJL |
| Scouring | with scouring | with scouring | without scouring |
| Thickness ($\mu$m) | 173 | 173 | 174 |
| Basis of weight (g/m$^2$) | 116 | 116 | 116 |
| Air permeability (cm$^3$/cm$^2$/sec) | 0.4 | 0.4 | 0.5 |
| Residual oil content (%) | 0.1 | 2.0 | 0.2 |
| After heat resistance test | | | |
| Tear | | | |
| Strength (N) | 37/39 | 68/60 | 45/50 |
| Retention ratio (%) | 60/57 | 104/98 | 72/75 |
| FMVSS302 combustion | self-extinguished | 305 mm/min | self-extinguished |
| Tensile strength (cN/dtex)* | 6.5/6.7 | 6.5/6.7 | 6.5/6.7 |
| Folding height (mm) | 1.7 | 1.7 | 1.7 |
| Mean bending rigidity (B) | 1.0/2.9 | 1.0/2.9 | 1.0/2.9 |
| Mean bending hysteresis width (2HB) | 1.2/2.9 | 1.2/3.0 | 1.2/3.0 |
| Surface coarseness (SDM) | 6.4/3.1 | 6.4/3.5 | 6.4/3.5 |
| Standard deviation of frictional coefficient (MMD) | 0.017/0.017 | 0.014/0.014 | 0.017/0.017 |
| Bag | | | |
| Compactness (mm) | 15 | 15 | 15 |
| Folded shape retaining property | ○ | ○ | ○ |
| Expansibility | ○ | ○ | ○ |
| Heat resistant expansion | rupture | ○ | rupture |

*tensile strength of warp/weft directions of woven fabric, N66 represents polyhexamethylene adipamide
**(dtex · end/2.54 cm/dtex · pick/2.54 cm)

What is claimed is:

1. A base fabric for an air bag comprising a woven fabric having warp and weft formed of a polyamide fiber having a copper content of 1 to 200 ppm, a single filament size of 0.5 to 4.5 dtex, a yarn size of 67 to 250 dtex and tensile strength of at least 5.7 cN/dtex, and a bending rigidity per unit width of 0.5 to 5 mN·cm$^2$/cm in terms of mean bending rigidity (B) in KES measurement, an oiling agent adhering to at least the warp yarns or weft yarns prior to weaving and at least a resulting 0.8 wt % of an oiling agent being adhered to the woven fabric after weaving, wherein a basis weight of the woven fabric per unit area is not greater than 250 g/m$^2$ and a thickness not greater than 0.30 mm, and the base fabric exhibiting self-extinguishing property according to FMVSS302 combustion test.

2. A base fabric for an air bag according to claim 1, wherein the surface of said woven fabric has a surface coarseness of 1 to 7 μm in terms of a surface coarseness (SMD) in KES measurement and is 0.01 to 0.04 in terms of a mean deviation (MMD) of a coefficient of friction, and a bending recovery of said woven fabric is 0.5 to 5 mN·cm/cm in terms of a mean bending hysteresis width (2 HB) in KES measurement.

3. A base fabric for an air bag according to claim 1, wherein the warp and the weft have a copper content of 30 to 200 ppm, a single filament size of 0.5 to 3.3 dtex and a yarn size of 67 to 160 dtex, and the warp has the number of intermingling points of 25 nodes or more /m.

4. A base fabric for the air bag according to claim 1, wherein an adhesion ratio of the oiling agent to the weft is by at least 0.1 wt % greater than the adhesion ratio to the warp.

5. A base fabric for an air bag according to claim 1, wherein a product of the yarn size of the polyamide fiber and the weave density in each of the warp and weft directions in said woven fabric is not greater than 20,000 dtex.end (or dtex.pick)/2.54 cm.

6. A base fabric for an air bag according to claim 1, wherein the product of a yarn size of the polyamide fiber and a weave density in each of the warp and weft directions in said woven fabric is not greater than 16,000 dtex.end (or dtex.pick)/2.54 cm.

7. A base fabric for an air bag according to claim 1, wherein the polyamide fiber is a polyhexamethylene adipamide fiber having a $H_2SO_4$ relative viscosity of 2.5 to 3.3.

8. A process for producing a base fabric for a light-weight air bag comprising the steps of:

(a) providing warp and weft yarns composed of a polyamide containing 1 to 200 ppm of copper as a copper compound, and having a single filament size of 0.5 to 4.5 dtex and a yarn size of 67 to 250 dtex;

(b) warping the w yarn with an oiling agent adhered thereto in the absence of a sizing agent;

(c) weaving the warp and weft yarn on a loom to obtain a woven fabric provided with 0.8 wt % of an oiling agent adhering thereto, the woven fabric having a weave density of at least 80 ends (or picks)/2.54 cm, a product of yarn size of the polyamide fiber and the weave density of not greater than 20,000 dtex.end (or dtex.pick)/2.54 cm in each of the warp and the weft directions of the woven fabric.

9. A light weight pliable base fabric for use in an air bag comprising a woven fabric having warp and weft formed of polyamide fiber yarns, the yarn having a plurality of single filaments having a fineness in the range of 0.5 to 4.5 dtex and the yarn being of 67 to 250 dtex, wherein the improvement comprises the polyamide fiber having a copper content of 1 to 200 ppm and the warp yarns and/or the weft yarns having prior to weaving an oiling agent adhered thereto, resulting in at least a 0.8 wt. % of the oiling agent being adhered to the woven fabric, and the base fabric exhibiting self-extinguishing property according to FMVSS302 combustion test.

10. A base fabric for an air bag according to claim 9, wherein the surface of said woven fabric has a surface coarseness of 1 to 7 μm in terms of a surface coarseness (SMD) in KES measurement and is 0.01 to 0.04 in terms of a mean deviation (MMD) of a coefficient of friction, and a bending recovery of said woven fabric is 0.5 to 5 mN·cm/cm in terms of a mean bending hysteresis width (2 HB) in KES measurement.

11. A base fabric for an air bag according to claim 9, wherein the warp and the weft have a copper content of 30 to 200 ppm, a single filament size of 0.5 to 3.3 dtex and a yarn size of 67 to 160 dtex, and the warp has the number of intermingling points of 25 nodes or more /m.

12. A base fabric for the air bag according to claim 9, wherein an adhesion ratio of the oiling agent to the weft is by at least 0.1 wt % greater than the adhesion ratio to the warp.

13. A base fabric for an air bag according to claim 9, wherein a product of the yarn size of the polyamide fiber and the weave density in each of the warp and weft directions in said woven fabric is not greater than 20,000 dtex.end (or dtex.pick)/2.54 cm.

14. A base fabric for an air bag according to claim 9, wherein the product of a yarn size of the polyamide fiber and a weave density in each of the warp and weft directions in said woven fabric is not greater than 16,000 dtex.end (or dtex.pick)/2.54 cm.

15. An air bag comprising said base fabric for an air bag according to any one of claims 1, 2, 3, 4, 5, 6, 7, 9, 10, 11, 12, 13, or 14.

\* \* \* \* \*

UNITED STATES PATENT AND TRADEMARK OFFICE
CERTIFICATE OF CORRECTION

PATENT NO.   : 6,601,614 B1
DATED         : August 5, 2003
INVENTOR(S)  : Hideaki Ishii It is certified that error appears in the above-identified patent and that said Letters Patent is hereby corrected as shown below:

Column 25,
Line 40, "w yarn" should read -- warp yarn --.

Column 26,
Lines 1-2, "dtex.end (or dtex.pick)" should read -- dtex·end (or dtex·pick) --.

Signed and Sealed this

Fourteenth Day of September, 2004

JON W. DUDAS
*Director of the United States Patent and Trademark Office*